US009151679B2

(12) United States Patent
MacDonald et al.

(10) Patent No.: US 9,151,679 B2
(45) Date of Patent: Oct. 6, 2015

(54) TEMPERATURE MEASUREMENT IN ELECTRONIC DEVICES

(75) Inventors: Mark MacDonald, Beaverton, OR (US); Keith R. Tinsley, Beaverton, OR (US); Harry G. Skinner, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1044 days.

(21) Appl. No.: 12/215,909

(22) Filed: Jun. 30, 2008

(65) Prior Publication Data

US 2009/0322472 A1    Dec. 31, 2009

(51) Int. Cl.
*H04Q 5/22* (2006.01)
*G01K 7/32* (2006.01)
*G01K 1/02* (2006.01)
*H04B 5/00* (2006.01)
*G06K 19/07* (2006.01)

(52) U.S. Cl.
CPC ........ *G01K 7/32* (2013.01); *G01K 1/024* (2013.01); *G06K 19/0717* (2013.01); *H04B 5/0031* (2013.01); *H04B 5/0062* (2013.01)

(58) Field of Classification Search
USPC ............. 340/870.17, 10.1, 10.2; 361/679.47, 361/93.8
See application file for complete search history.

(56) References Cited

U.S. PATENT DOCUMENTS

| | | | | |
|---|---|---|---|---|
| 3,641,538 A | * | 2/1972 | Whitney et al. | 340/870.18 |
| 3,651,405 A | * | 3/1972 | Whitney et al. | 340/870.18 |
| 3,737,905 A | * | 6/1973 | Haroules et al. | 342/351 |
| 3,872,455 A | * | 3/1975 | Fuller et al. | 340/870.05 |
| 4,196,626 A | * | 4/1980 | Manion et al. | 374/118 |
| 4,321,933 A | * | 3/1982 | Baessler | 600/549 |
| 4,455,096 A | * | 6/1984 | Brandstedt | 374/170 |
| 4,471,354 A | * | 9/1984 | Smith | 340/870.17 |
| 4,986,670 A | * | 1/1991 | Uchiyama et al. | 374/117 |
| 5,077,545 A | * | 12/1991 | Gopani et al. | 333/195 |
| 5,140,146 A | * | 8/1992 | Metlitsky et al. | 235/462.26 |
| 5,349,162 A | * | 9/1994 | Holling | 219/445.1 |
| 5,467,399 A | * | 11/1995 | Whitecar | 381/4 |
| 5,481,262 A | * | 1/1996 | Urbas et al. | 340/870.17 |
| 5,629,981 A | * | 5/1997 | Nerlikar | 713/168 |
| 5,682,149 A | * | 10/1997 | Hofman | 340/870.17 |
| 5,745,049 A | * | 4/1998 | Akiyama et al. | 340/870.17 |
| 5,880,680 A | * | 3/1999 | Wisehart et al. | 340/853.4 |

(Continued)

FOREIGN PATENT DOCUMENTS

| | | |
|---|---|---|
| CN | 1602798 A | 4/2005 |
| CN | 1753045 A | 3/2006 |

(Continued)

OTHER PUBLICATIONS

Office Action Received for Chinese Patent Application No. 200910139555.3, mailed on Mar. 30, 2011, 4 pages of Office Action and 6 pages of English translation.

(Continued)

*Primary Examiner* — Jennifer Mehmood
*Assistant Examiner* — Rufus Point
(74) *Attorney, Agent, or Firm* — Alpine Technology Law Group LLC

(57) ABSTRACT

In one embodiment, a system comprises a portable computing device comprises a housing, at least one temperature sensitive radio frequency signal source proximate the housing and at least one radio frequency interface to receive a radio signal generated by the at least one temperature sensitive radio frequency signal source.

19 Claims, 6 Drawing Sheets

(56) References Cited

U.S. PATENT DOCUMENTS

| | | | |
|---|---|---|---|
| 5,969,606 A * | 10/1999 | Reber et al. | 340/540 |
| 6,020,820 A * | 2/2000 | Chiang | 340/584 |
| 6,060,966 A * | 5/2000 | Tennant et al. | 333/202 |
| 6,150,921 A * | 11/2000 | Werb et al. | 340/10.1 |
| 6,233,409 B1 * | 5/2001 | Haines et al. | 399/10 |
| 6,255,622 B1 * | 7/2001 | May et al. | 219/209 |
| 6,297,742 B1 * | 10/2001 | Canada et al. | 340/635 |
| 6,522,213 B2 * | 2/2003 | Hashimoto | 332/170 |
| 6,697,254 B1 * | 2/2004 | King et al. | 361/679.48 |
| 6,717,788 B2 * | 4/2004 | Sommer et al. | 361/103 |
| 6,760,311 B1 * | 7/2004 | Raith | 370/252 |
| 6,778,386 B2 * | 8/2004 | Garnett et al. | 361/679.48 |
| 6,813,150 B2 * | 11/2004 | King et al. | 361/679.48 |
| 6,847,912 B2 * | 1/2005 | Forster | 702/130 |
| 6,892,545 B2 * | 5/2005 | Ishikawa et al. | 62/126 |
| 6,903,662 B2 * | 6/2005 | Rix et al. | 341/22 |
| 6,937,145 B2 * | 8/2005 | Okubo et al. | 340/447 |
| 7,076,998 B2 * | 7/2006 | Bulst et al. | 73/146 |
| 7,089,736 B2 * | 8/2006 | Mc Donald | 60/602 |
| 7,102,526 B2 * | 9/2006 | Zweig | 340/588 |
| 7,200,512 B2 * | 4/2007 | Lalau et al. | 702/130 |
| 7,248,892 B2 * | 7/2007 | White et al. | 455/550.1 |
| 7,274,291 B2 * | 9/2007 | Shaffer et al. | 340/539.26 |
| 7,336,176 B2 * | 2/2008 | Chang | 340/572.1 |
| 7,359,686 B2 * | 4/2008 | Beumer et al. | 455/136 |
| 7,360,945 B2 * | 4/2008 | Kardach et al. | 374/141 |
| 7,388,497 B1 * | 6/2008 | Corbett et al. | 340/572.4 |
| 7,417,554 B2 * | 8/2008 | Benke et al. | 340/638 |
| 7,443,133 B2 * | 10/2008 | Hamada et al. | 320/101 |
| 7,489,246 B2 * | 2/2009 | Himberger et al. | 340/572.1 |
| 7,508,225 B2 * | 3/2009 | Taylor | 324/721 |
| 7,551,448 B2 * | 6/2009 | Roberts | 361/737 |
| 7,589,629 B2 * | 9/2009 | Tupman et al. | 340/539.11 |
| 7,597,250 B2 * | 10/2009 | Finn | 235/380 |
| 7,751,790 B2 * | 7/2010 | Rofougaran | 455/292 |
| 7,751,857 B2 * | 7/2010 | Beumer et al. | 455/572 |
| 7,796,038 B2 * | 9/2010 | Batra | 340/572.1 |
| 7,818,561 B2 * | 10/2010 | Erickson et al. | 713/100 |
| 7,838,780 B2 * | 11/2010 | Soares et al. | 174/354 |
| 7,860,018 B2 * | 12/2010 | Raith | 370/252 |
| 7,860,582 B2 * | 12/2010 | Ghercioiu et al. | 700/1 |
| 2003/0197004 A1 * | 10/2003 | Krieger et al. | 219/494 |
| 2004/0036626 A1 * | 2/2004 | Chan et al. | 340/870.17 |
| 2004/0174833 A1 * | 9/2004 | Raith | 370/311 |
| 2004/0233041 A1 * | 11/2004 | Bohman et al. | 340/10.1 |
| 2005/0109094 A1 | 5/2005 | Umegaki et al. | |
| 2006/0118539 A1 * | 6/2006 | Leizerovich | 219/209 |
| 2006/0183446 A1 * | 8/2006 | Beumer et al. | 455/136 |
| 2006/0193113 A1 * | 8/2006 | Cohen et al. | 361/687 |
| 2006/0208881 A1 * | 9/2006 | Suzuki | 340/539.27 |
| 2007/0194913 A1 * | 8/2007 | Yokoshima et al. | 340/539.26 |
| 2008/0096609 A1 * | 4/2008 | Lam et al. | 455/566 |
| 2008/0100419 A1 * | 5/2008 | Jatschka et al. | 340/10.1 |
| 2008/0111681 A1 * | 5/2008 | Rathbone et al. | 340/540 |
| 2008/0186184 A1 * | 8/2008 | August et al. | 340/572.7 |
| 2008/0269954 A1 * | 10/2008 | Lev et al. | 700/299 |
| 2009/0083003 A1 * | 3/2009 | Reggiardo | 702/187 |
| 2009/0141433 A1 * | 6/2009 | Maloney et al. | 361/679.01 |
| 2010/0289450 A1 * | 11/2010 | Kook | 320/108 |
| 2010/0289669 A1 * | 11/2010 | Saltzman et al. | 340/870.17 |

FOREIGN PATENT DOCUMENTS

| | | |
|---|---|---|
| CN | 201138517 Y | 10/2008 |
| JP | 64-63829 A | 3/1989 |
| JP | 06-237669 A | 8/1994 |
| JP | H10257399 A | 9/1998 |
| JP | 10-307648 A | 11/1998 |
| JP | 2004-144683 A | 5/2004 |
| JP | 2005-153722 A | 6/2005 |
| JP | 2005-228153 A | 8/2005 |
| JP | 2006-259598 A | 9/2006 |
| JP | 2007-012052 A | 1/2007 |
| JP | 2007-315917 A | 12/2007 |
| JP | 2008-126701 A | 6/2008 |
| TW | I278303 B | 4/2007 |
| TW | I408349 B | 9/2013 |

OTHER PUBLICATIONS

Office Action Received for Japanese Patent Application No. 2009-152901, mailed on Jun. 28, 2011, 4 pages of Office Action and 5 pages of English translation.

Notice of Allowance Received for Chinese Patent Application No. 200910139555.3, mailed on Oct. 8, 2011, 2 pages of Notice of Allowance and 2 pages of English Translation.

Office Action Received for Japanese Patent Application No. 2009-152901, mailed on Jan. 17, 2012, 5 pages of Office Action and 6 pages of English Translation.

Office Action received for Tawain Patent Application No. 098121009, mailed on Dec. 3, 2012, 8 pages of English Translation and 5 pages of Office Action.

Office Action received for Japanese Patent Application No. 2009-152901, mailed on Jun. 5, 2012, 4 pages of English.

Notice of Allowance received for Japanese Patent Application No. 2009-152901, mailed on Nov. 27, 2012, 3 pages of Office Action.

Office Action received for Japanese Patent Application No. 2012-282391, mailed on Nov. 19, 2013, 4 pages of English Translation and 3 pages of Office Action.

Office Action received for Japanese Patent Application No. 2012-282391, mailed on Jul. 29, 2014, 3 pages of English Translation and 4 pages of Japanese Office Action.

Office Action received for Japanese Patent Application No. 2012-282391, mailed on Apr. 15, 2014, 2 pages of English Translation and 2 pages of Japanese Office Action.

* cited by examiner

TEMPERATURE MEASUREMENT IN ELECTRONIC DEVICES

RELATED APPLICATIONS

None.

BACKGROUND

The subject matter described herein relates generally to the field of electronic communication and more particularly to a temperature measurement in electronic devices.

Electronic devices may benefit from accurate temperature sampling. Accurate temperature detection may permit designers of integrated circuit devices to develop control techniques that balance operating speeds with heat dissipation capabilities of the electronic device in order to satisfy ergonomic and device thermal limits.

BRIEF DESCRIPTION OF THE DRAWINGS

The detailed description is described with reference to the accompanying figures.

DETAILED DESCRIPTION

Described herein are exemplary systems and methods for implementing temperature measurement in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

In some aspects, the subject matter described herein enhances the ability of designers and manufacturers of electronic devices to measure temperatures remote from a circuit board, integrated circuit, or other location in the device which has easy access to a communication path in the electronic device. For example, temperature measurements in locations proximate the skin, or housing, of the device may be of interest to designers and manufacturers of electronic devices. However, such locations are typically not provided with convenient access to a communication path associated with the controlling circuitry of the electronic device. To address this issue, a temperature sensitive radio frequency source may be mounted on the electronic device, and may cooperate with a wireless radio frequency interface on the device to relay temperature information to the device. The temperature sensitive radio frequency source may be active or passive.

Figure 1:
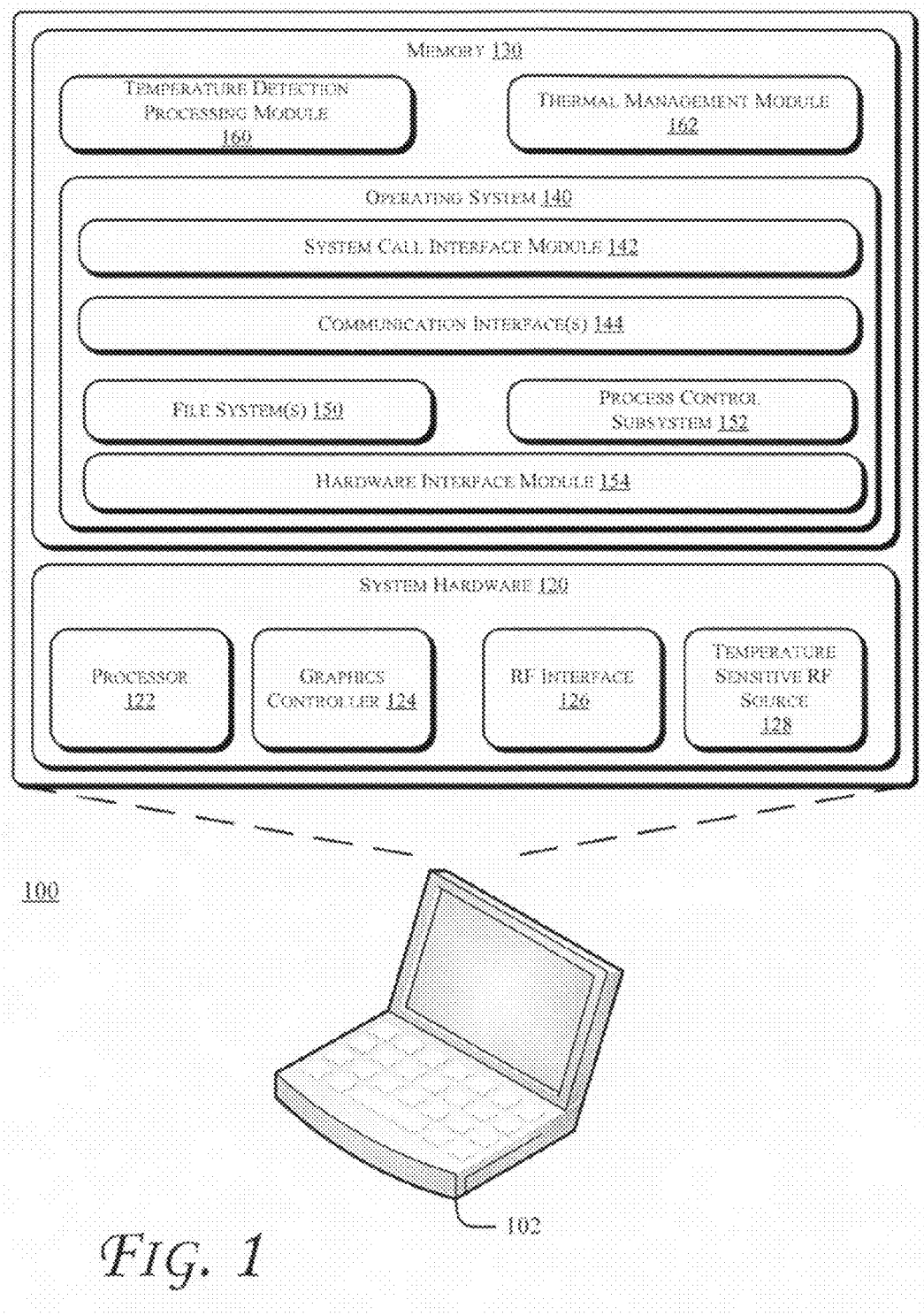
FIG. 1 is a schematic illustration of a computing system adapted to accommodate temperature measurement, according to some embodiments.

In some embodiments, an electronic device adapted to implement temperature measurement as described herein may be embodied as a computing system, while in other embodiments the electronic device may be embodied as a personal digital assistant (PDA), mobile phone, or a special purpose device, e.g., a video display device or a game console. FIG. 1 is a schematic illustration of a computing system 100 adapted to accommodate temperature measurement, according to some embodiments. Computing system 100 includes a computing device 102 and one or more accompanying input/output devices including a display, one or more speakers, a keyboard, and one or more other I/O device(s).

The computing device 102 includes system hardware 120 and memory 130, which may be implemented as random access memory and/or read-only memory. Memory 130 may include an operating system 140 for managing operations of computing device 208. In some embodiments, operating system 140 includes a hardware interface module 154 that provides an interface to system hardware 120. In addition, operating system 140 may include a file system 150 that manages files used in the operation of computing device 102 and a process control subsystem 152 that manages processes executing on computing device 102.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

System hardware 120 may include one or more processors 122 and a graphics controller 124. In some embodiments, processor 122 may be embodied as an Intel® Pentium IV® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics controller 124 may function as an adjunction processor that manages graphics and/or video operations. Graphics controller 124 may be integrated onto the motherboard of computing system 100 or may be coupled via an expansion slot on the motherboard.

Computing system 100 further includes a radio frequency (RF) interface 126. In some embodiments, RF interface 126 may be embodied as a wireless interface such as an IEEE 802.11a, b, g or n-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a RF interface 126 would be a general packet radio service (GPRS) interface (see, e.g., Guidelines on GPRS Handset Requirements, Global System for Mobile Communications/GSM Association, Ver. 3.0.1, December 2002). Yet another example of a RF interface 126 would be a WiMAX interface.

Computer system 100 further includes at least one temperature sensitive radio frequency (RF) signal source 128. RF signal source 128 may be implemented as a passive device, i.e., in a device which does not generate and/or transmit its own radio signal, but rather filters or otherwise modulates a RF signal generated by another component. Alternately, RF signal source 128 may be implemented as an active device that generates and/or transmits its own RF signal. RF signal source 128 may be located anywhere within (or on) computer system 100. In some embodiments, one or more RF signal sources 128 may be located on the enclosure skin of computer 102.

In operation, the RF interface 126 receives RF signals from the temperature sensitive RF source 128. A thermal detection processing module 160 processes the received signals to determine a temperature from the signal generated by the temperature sensitive RF source 128. In some embodiments, thermal management module 162 may manage one or more operations of the compute system 100 as a function of the temperature reading. Additional aspects of structure and function for temperature measurement in electronic devices will be explained with reference to FIGS. 2 and 3A-3C. Further, in some embodiment, thermal detection processing module 160 and thermal management module 162 could be integrated into a processing unit, e.g., a graphics processor or a general purpose processor.

Figure 2:
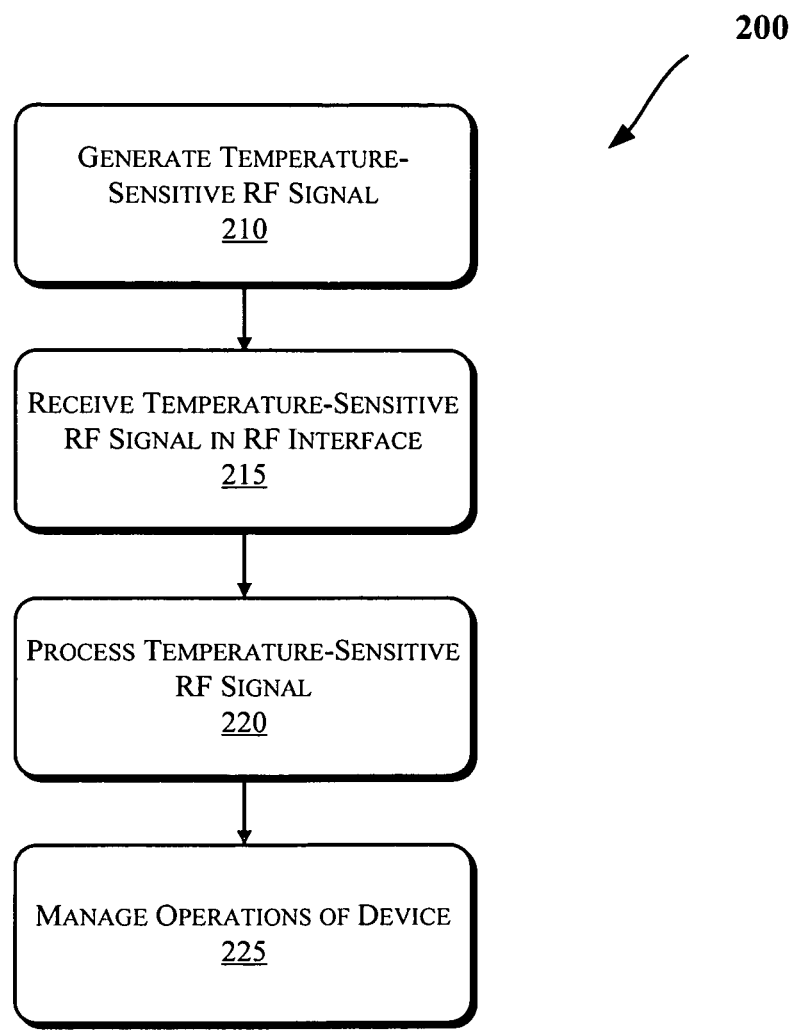
FIG. 2 is a flowchart illustrating various operations performed by computer system 100 to monitor temperature in accordance with some embodiments.

FIG. 2 is a flowchart illustrating various operations performed by computer system 100 to monitor temperature in accordance with some embodiments. Referring to FIG. 2, at operation 210 the temperature sensitive RF signal source 128 generates an RF signal. The particular form of the RF signal and techniques for generating, receiving, and processing the RF signal may vary between embodiments of the temperature sensitive RF signal source 128.

Figure 3A:
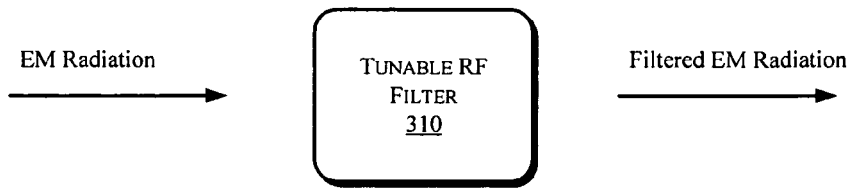
FIGS. 3A-3C are schematic illustrations of embodiments of a temperature sensitive radio frequency signal source.

Referring now to FIG. 3A, in some embodiments the temperature sensitive RF signal source 128 may be implemented as an RF filter 310 that filters an electromagnetic signal from the RF interface 126 or another source as a function of the temperature proximate the temperature sensitive RF signal source 128. For example, the temperature sensitive RF signal source 128 may be a notch filter calibrated to filter out a specific frequency range as a function of the temperature proximate the temperature sensitive RF signal source 128. The tunable RF filter 310 receives electromagnetic radiation, which may be generated by a radiation source such as the RF interface 126 or may be background electromagnetic interference generated by one or more components of the electronic device. The tunable RF filter filters out one or more specific wavelengths as a function of the temperature proximate the filter, such that the output of the tunable filter is a filtered electromagnetic radiation signal.

Referring back to FIG. 2, at operation 215 the RF interface 126 may receive the filtered RF signal generated by the tunable RF filter 310. At operation 220 the temperature detection processing module 160 processes the temperature sensitive RF signal, e.g., by detecting the filtered frequency range and determining the temperature proximate the temperature sensitive RF signal source 128 based on the frequency range filtered. At operation 225 the thermal management module 162 may manage one or more operations of the device as a function of the temperature measurement determined from the temperature detection processing module. For example, the thermal management module may increase a speed of one or more fans operating on the electronic device, or may reduce the operating speed of one or more electronic components on the electronic device.

Figure 3B:
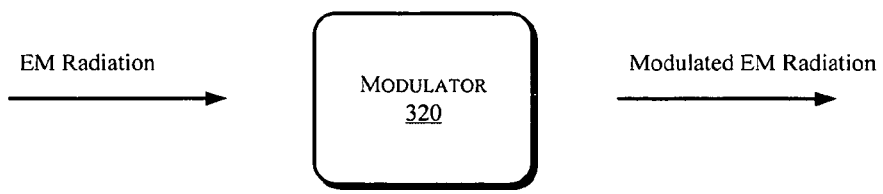

Referring now to FIG. 3B, in some embodiments the temperature sensitive RF signal source 128 may be implemented as an RF signal modulator 320 that modulates an electromagnetic signal from the RF interface 126 or another source as a function of the temperature proximate the temperature sensitive RF signal source 128. For example, the modulator 320 may be calibrated to introduce a specific modulated waveform into the RF signal as a function of the temperature proximate the temperature sensitive RF signal source 128.

Referring back to FIG. 2, at operation 215 the RF interface 126 may receive the modulated RF signal generated by the modulator 320. At operation 220 the temperature detection processing module 160 processes the temperature sensitive RF signal, e.g., determining the temperature proximate the temperature sensitive RF signal source 128 based on the modulation pattern in the RF signal. At operation 225 the thermal management module 162 may manage one or more operations of the device as a function of the temperature measurement determined from the temperature detection processing module. For example, the thermal management module may increase a speed of one or more fans operating on the electronic device, or may reduce the operating speed of one or more electronic components on the electronic device.

Figure 3C:
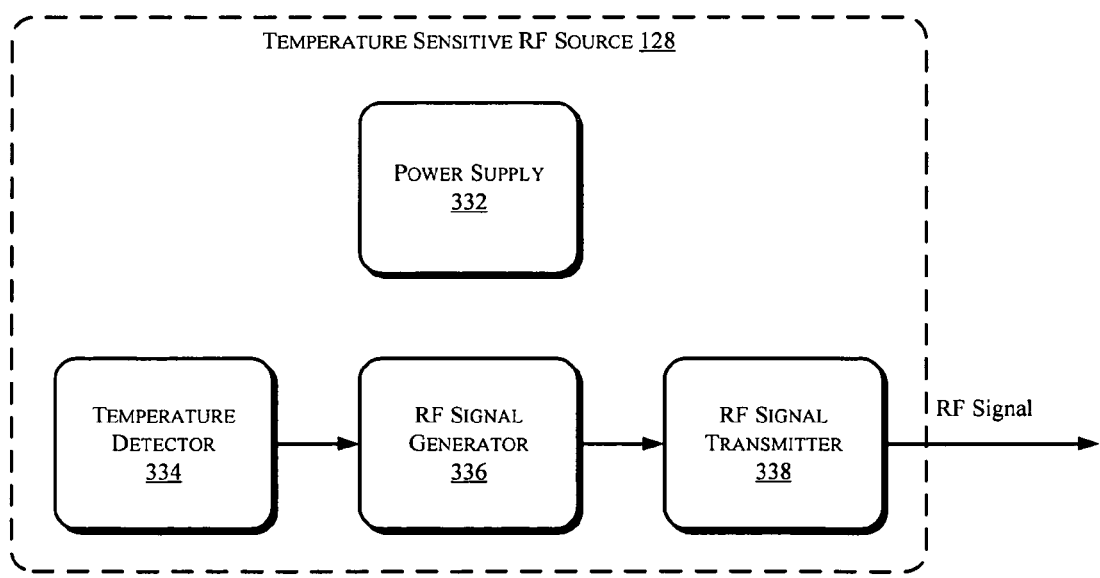

Referring now to FIG. 3C, in some embodiments the temperature sensitive RF signal source 128 may be implemented as a temperature detector 334 coupled to an active RF signal generator 336 and transmitter 338. The temperature sensitive RF signal source 128 may include a power supply 332 such as the power supply on the computer system 102 or may be powered indirectly, e.g., by inductive coupling, or by absorption of incident RF radiation generated at another component or device in the computer system 102, such as the RF interface 126.

In such embodiments, the RF signal source 128 generates and transmits an electromagnetic signal which has at least one signal characteristic that varies as a function of the temperature proximate the temperature sensitive RF signal source 128. For example, as described above the temperature sensitive RF signal source 128 may be calibrated to introduce a specific modulated waveform into the RF signal as a function of the temperature proximate the temperature sensitive RF signal source 128. Alternatively, the temperature sensitive RF signal source 128 may transmit a code indicative of the temperature.

Referring back to FIG. 2, at operation 215 the RF interface 126 receives the RF signal transmitted by the RF signal transmitter 338. In some embodiments the transmission of RF to the interface may contain information relating to the sensor location in addition to the temperature information. Location information may be useful when more than one sensor is included in the electronic device to enable a controller to distinguish between different temperature signals. For example, different sensors can generate signals at slightly different frequencies, or at different amplitudes, or the signals may be multiplexed. At operation 220 the temperature detection processing module 160 processes the temperature sensitive RF signal, e.g., determining the temperature proximate the temperature sensitive RF signal source 128 based on the at least one temperature sensitive characteristic of the RF signal. At operation 225 the thermal management module 162 may manage one or more operations of the device as a function of the temperature measurement determined from the temperature detection processing module. For example, the thermal management module may increase a speed of one or more fans operating on the electronic device, or may reduce the operating speed of one or more electronic components on the electronic device.

Figure 4:
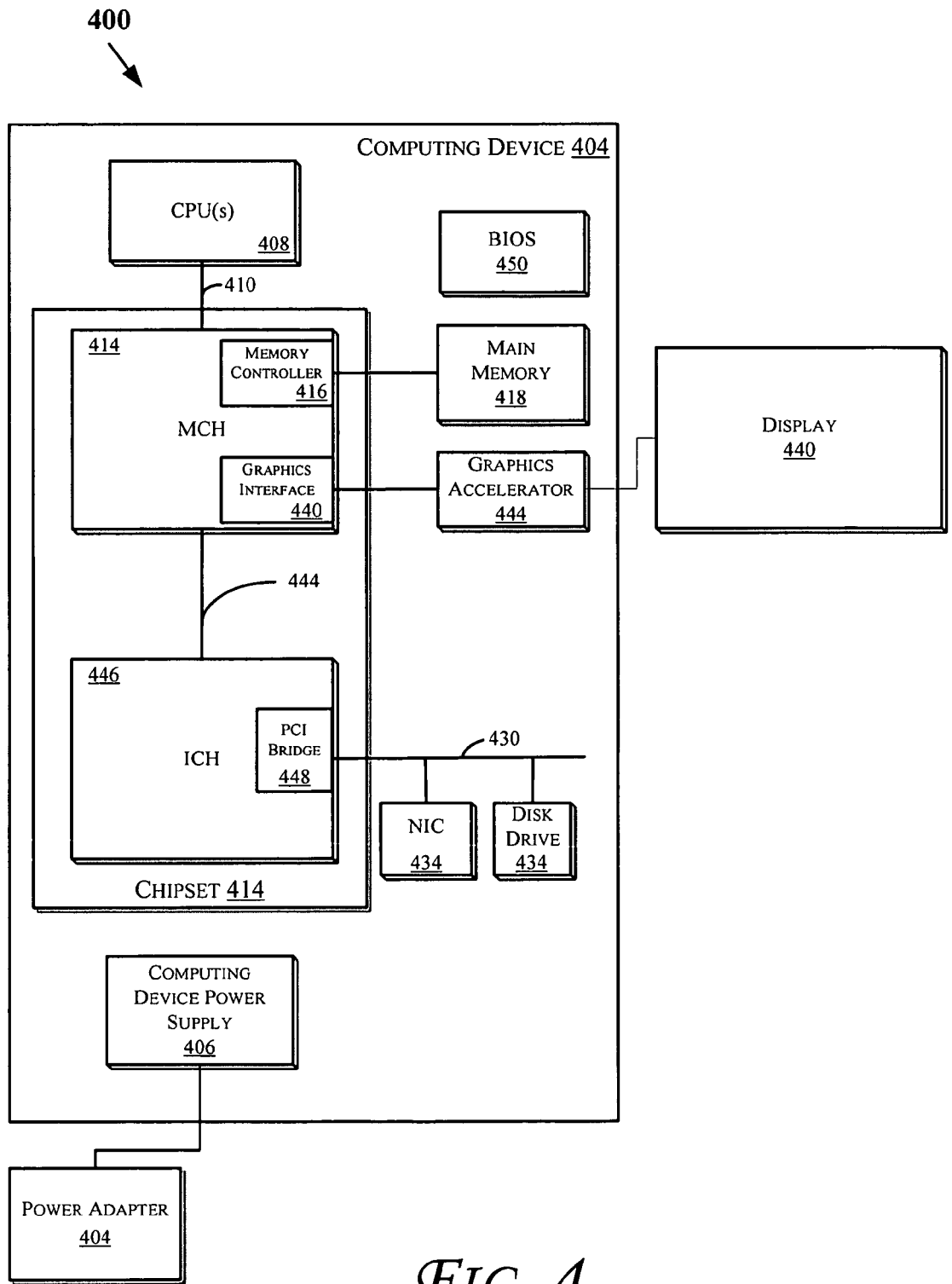
FIGS. 4-6 are a schematic illustration of architectures of computer systems which may be utilized to implement various embodiments discussed herein.

FIG. 4 is a schematic illustration of an architecture of a computer system which may be adapted to implement temperature measurement in accordance with some embodiments. Computer system 400 includes a computing device 402 and a power adapter 404 (e.g., to supply electrical power to the computing device 402). The computing device 402 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 402 (e.g., through a computing device power supply 406) from one or more of the following sources: one or more battery packs, an alternating current (AC) outlet (e.g., through a transformer and/or adaptor such as a power adapter 404), automotive power supplies, airplane power supplies, and the like. In one embodiment, the power adapter 404 may transform the power supply source output (e.g., the AC outlet voltage of about 110 VAC to 240 VAC) to a direct current (DC) voltage ranging between about 7 VDC to 12.6 VDC. Accordingly, the power adapter 404 may be an AC/DC adapter.

The computing device 402 may also include one or more central processing unit(s) (CPUs) 408 coupled to a bus 410. In one embodiment, the CPU 408 may be one or more processors in the Pentium® family of processors including the Pentium® II processor family, Pentium® III processors, Pentium® IV processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 412 may be coupled to the bus 410. The chipset 412 may include a memory control hub (MCH) 414. The MCH 414 may include a memory controller 416 that is coupled to a main system memory 418. The main system memory 418 stores data and sequences of instructions that are executed by the CPU 408, or any other device included in the system 400. In some embodiments, the main system memory 418 includes random access memory (RAM); however, the main system memory 418 may be implemented using other memory types such as dynamic RAM (DRAM), synchronous DRAM (SDRAM), and the like. Additional devices may also be coupled to the bus 410, such as multiple CPUs and/or multiple system memories.

In some embodiments, main memory 418 may include a one or more flash memory devices. For example, main memory 418 may include either NAND or NOR flash memory devices, which may provide hundreds of megabytes, or even many gigabytes of storage capacity.

The MCH 414 may also include a graphics interface 420 coupled to a graphics accelerator 422. In one embodiment, the graphics interface 420 is coupled to the graphics accelerator 422 via an accelerated graphics port (AGP). In an embodiment, a display (such as a flat panel display) 440 may be coupled to the graphics interface 420 through, for example, a signal converter that translates a digital representation of an image stored in a storage device such as video memory or system memory into display signals that are interpreted and displayed by the display. The display 440 signals produced by the display device may pass through various control devices before being interpreted by and subsequently displayed on the display.

A hub interface 424 couples the MCH 414 to an input/output control hub (ICH) 426. The ICH 426 provides an interface to input/output (I/O) devices coupled to the computer system 400. The ICH 426 may be coupled to a peripheral component interconnect (PCI) bus. Hence, the ICH 426 includes a PCI bridge 428 that provides an interface to a PCI bus 430. The PCI bridge 428 provides a data path between the CPU 408 and peripheral devices. Additionally, other types of I/O interconnect topologies may be utilized such as the PCI Express™ architecture, available through Intel® Corporation of Santa Clara, Calif.

The PCI bus 430 may be coupled to a network interface card (NIC) 432 and one or more disk drive(s) 434. Other devices may be coupled to the PCI bus 430. In addition, the CPU 408 and the MCH 414 may be combined to form a single chip. Furthermore, the graphics accelerator 422 may be included within the MCH 414 in other embodiments. In some embodiments, graphics accelerator 422 may be used as an adjunct processing unit.

Additionally, other peripherals coupled to the ICH 426 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like.

System 400 may further include a basic input/output system (BIOS) 450 to manage, among other things, the boot-up operations of computing system 400. BIOS 450 may be embodied as logic instructions encoded on a memory module such as, e.g., a flash memory module.

Figure 5:
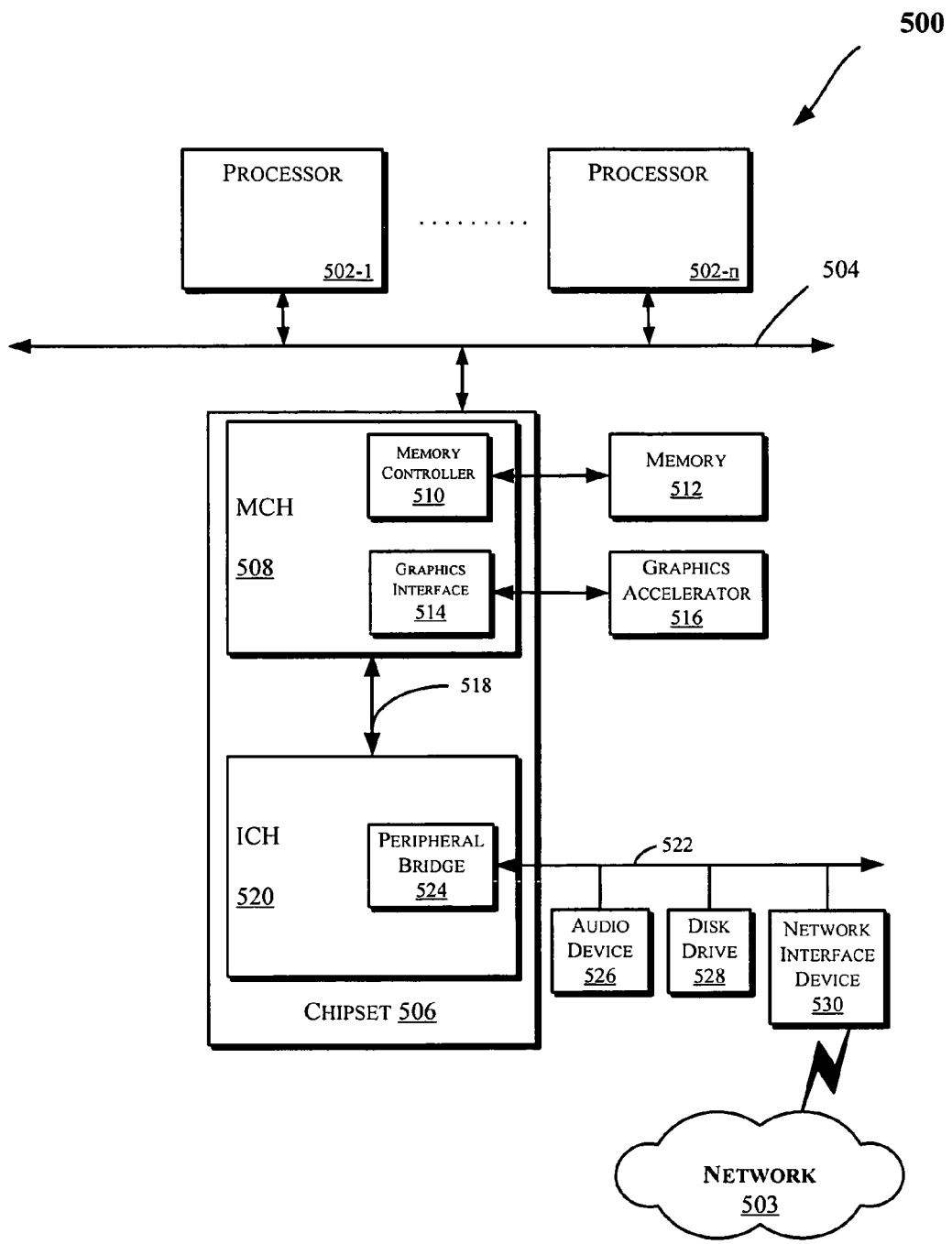

FIG. 5 illustrates a block diagram of a computing system 500 in accordance with an embodiment of the invention. The computing system 500 may include one or more central processing unit(s) (CPUs) 502 or processors in communication with an interconnection network (or bus) 504. The processors 502 may be any processor such as a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

A chipset 506 may also be in communication with the interconnection network 504. The chipset 506 may include a memory control hub (MCH) 508. The MCH 408 may include a memory controller 510 that communicates with a memory 512. The memory 512 may store data and sequences of instructions that are executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of memory. Nonvolatile memory may also be utilized such as a hard disk. Additional devices may communicate through the interconnection network 404, such as multiple CPUs and/or multiple system memories.

The MCH 508 may also include a graphics interface 514 that communicates with a graphics accelerator 516. In one embodiment of the invention, the graphics interface 514 may be in communication with the graphics accelerator 516 via an accelerated graphics port (AGP). In an embodiment of the invention, a display (such as a flat panel display) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the MCH 508 to communicate with an input/output control hub (ICH) 520. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of a bus. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other types of peripherals.

The bus 522 may communicate with an audio device 526, one or more disk drive(s) 528, and a network interface device 530 (which may be in communication with the computer network 503). Other devices may communicate through the bus 522. Also, various components (such as the network interface device 530) may be in communication with the MCH 508 in some embodiments of the invention. In addition, the processor 502 and the MCH 508 may be combined to form a single chip. Furthermore, the graphics accelerator 516 may be included within the MCH 508 in other embodiments of the invention. In some embodiments, graphics accelerator 516 may be used as an adjunct processing unit.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic instructions and/or data.

Figure 6:
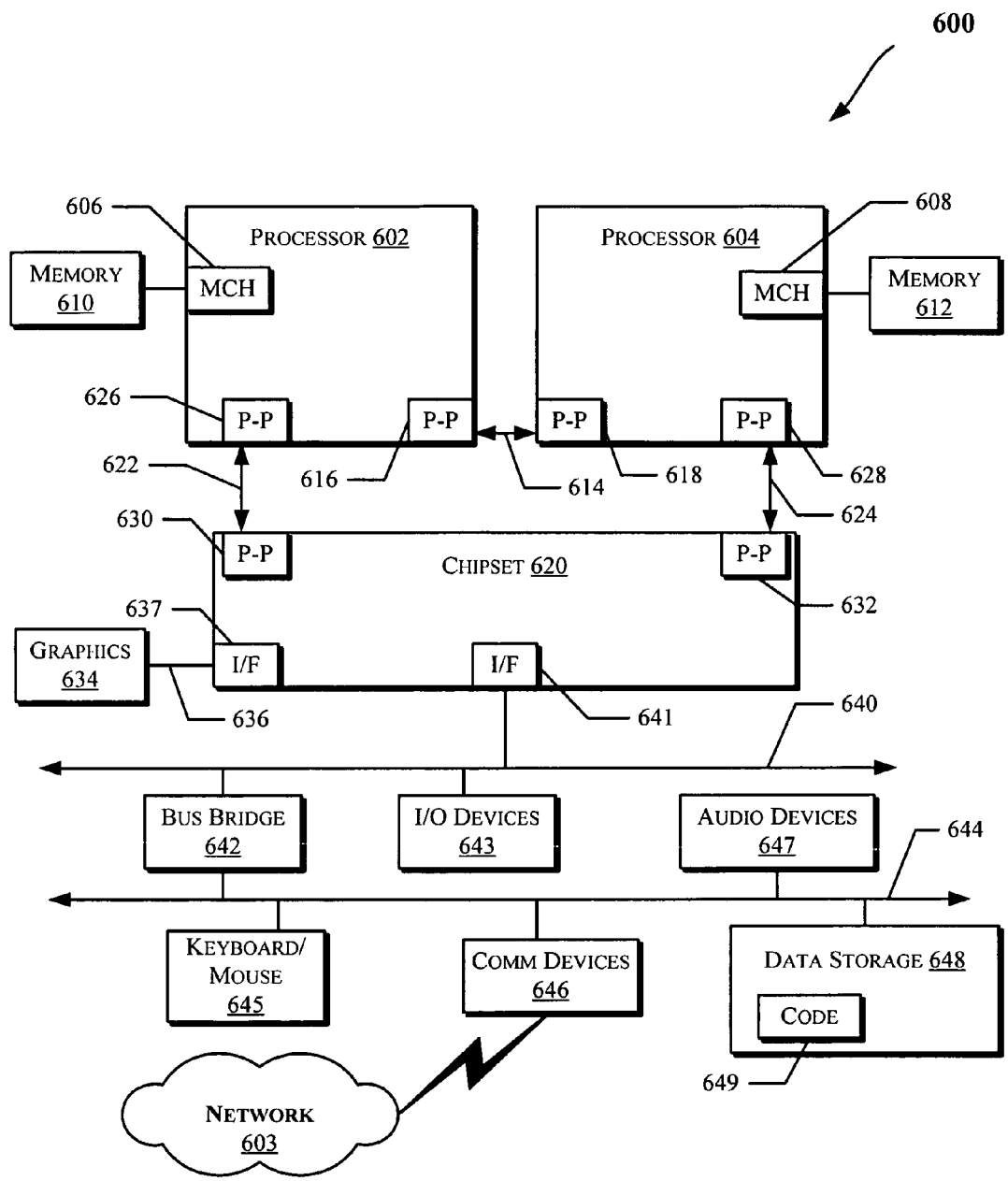

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces.

As illustrated in FIG. 6, the system 600 may include several processors, of which only two, processors 602 and 604 are shown for clarity. The processors 602 and 604 may each include a local memory controller hub (MCH) 606 and 608 to communicate with memories 610 and 612. The memories 610 and/or 612 may store various data such as those discussed with reference to the memory 612.

The processors 602 and 604 may be any type of a processor such as those discussed with reference to the processors 402 of FIG. 4. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may be in communication with a bus 640 using a PtP interface circuit 641. The bus 640 may have one or more devices that communicate with it, such as a bus bridge 642 and I/O devices 643. Via a bus 644, the bus bridge 643 may be in communication with other devices such as a keyboard/mouse 645, communication devices 646 (such as modems, network interface devices, or other types of communication devices that may be communicate through the computer network 603), audio I/O device, and/or a data storage device 648. The data storage device 648 may store code 649 that may be executed by the processors 602 and/or 604.

In various embodiments of the invention, the operations discussed herein may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any type of a storage device such as those discussed with respect to FIGS. 5 and 6.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
   at least one heat generating component;
   a radio frequency (RF) signal generator to generate at least a first RF signal at one or more frequencies, wherein the RF signal generator is to generate the first RF signal at a first frequency when the temperature sensor senses a first temperature and the RF signal generator is to generate the first RF signal at a second frequency when the temperature sensor senses a second temperature;
   an RF filter calibrated to filter out a specific frequency of the first RF signal as a function of a temperature proximate the RF signal generator;
   an RF signal transmitter to transmit at least the first RF signal,
   a radio frequency (RF) signal receiver to receive at least a second RF signal from an RF signal source device, the RF signal source device, including:

a second RF signal generator to generate the second RF signal; and a second RF signal transmitter to transmit the second RF signal; and a thermal management module to manage one or more operations of the at least one heat generating component as a function of the temperature proximate the RF signal generator.

2. The device of claim 1, further comprising:

a power converter to convert the second RF signal into energy used to operate at least one of the RF signal generator and the RF signal transmitter.

3. The device of claim 1, wherein the RF filter comprises a notch filter.

4. The device of claim 1, further comprising:

at least one antenna, the RF signal receiver to receive at least the second RF signal through the at least one antenna.

5. The device of claim 1, further comprising:

a power source to provide power to at least one of the RF signal receiver and the RF signal transmitter for operation.

6. The system of claim 3, wherein the filter is a notch filter calibrated to filter out a specific frequency as a function of temperature.

7. A method to manage components of an electronic device, comprising:

generating a first RF signal at a first frequency when a temperature sensor senses a first temperature and generating the first RF signal at a second frequency when the temperature sensor senses a second temperature;

filtering out a specific frequency of the first RF signal as a function of a temperature proximate the RF signal generator;

transmitting, from a first RF signal transmitter, the first RF signal;

receiving, at a radio frequency (RF) signal receiver, at least a second RF signal from an RF signal source device;

generating, at a second RF signal generator, the second RF signal; and transmitting, from a second RF signal transmitter, the second RF signal; and managing one or more operations of the at least one heat generating component as a function of the temperature proximate the RF signal generator.

8. The method of claim 7, further comprising:

the second RF signal causing at least the generating of the first RF signal.

9. The method of claim 8, further comprising:

converting the second RF signal into a form of energy to power a device generating at least the first RF signal.

10. The method of claim 7, further comprising:

the second RF signal causing at least the measuring of the first temperature.

11. The method of claim 10, further comprising:

converting the second RF signal into a form of energy to power a device measuring at least the first temperature.

12. The method of claim 7, further comprising:

the second RF signal causing at least the transmitting of the first RF signal.

13. The method of claim 12, further comprising:

converting the second RF signal into a form of energy to power a device transmitting the first RF signal.

14. The method of claim 7, further comprising:

generating the first RF signal at the first frequency at least in part by filtering out one or more other RF signal frequencies as a function of a temperature proximate the filter.

15. A system comprising:

a remote temperature sensing device, including:
    a temperature sensor;
    a first radio frequency (RF) signal generator to generate at least a first RF signal at one or more frequencies, each generated frequency associated with a given temperature sensed by the temperature sensor, wherein the RF signal generator is to generate the first RF signal at a first frequency when the temperature sensor senses a first temperature and the RF signal generator is to generate the first RF signal at a second frequency when the temperature sensor senses a second temperature;
    a first RF signal transmitter to transmit the first RF signal; and
    a radio frequency (RF) signal receiver to receive at least a second RF signal from an RF signal source device; and the RF signal source device, including:
    a second RF signal generator to generate the second RF signal; and
    a second RF signal transmitter to transmit the second RF signal; and
    a thermal management module to manage one or more operations of the at least one heat generating component as a function of the temperature proximate the RF signal generator.

16. The system of claim 15, wherein the remote temperature sensing device operates passively, the remote temperature sensor device further includes:

a power converter to convert RF signals received from the RF signal receiver into energy used to operate at least one of the RF signal generator and the RF signal transmitter.

17. The system of claim 15, wherein the remote temperature sensing device further includes:

an RF filter, the RF filter to cause the first RF signal generator to generate the first RF signal at the first frequency at least in part by filtering out one or more other RF signal frequencies as a function of a temperature proximate the filter.

18. The system of claim 15, further comprising:

at least one antenna, the RF signal receiver to receive the one or more RF signals through the at least one antenna.

19. The system of claim 17, wherein the filter is a notch filter calibrated to filter out a specific frequency as a function of temperature.

* * * * *